M. F. SADLER.
HORSE DETACHING DEVICE.
APPLICATION FILED JAN. 16, 1909.
922,518.
Patented May 25, 1909.
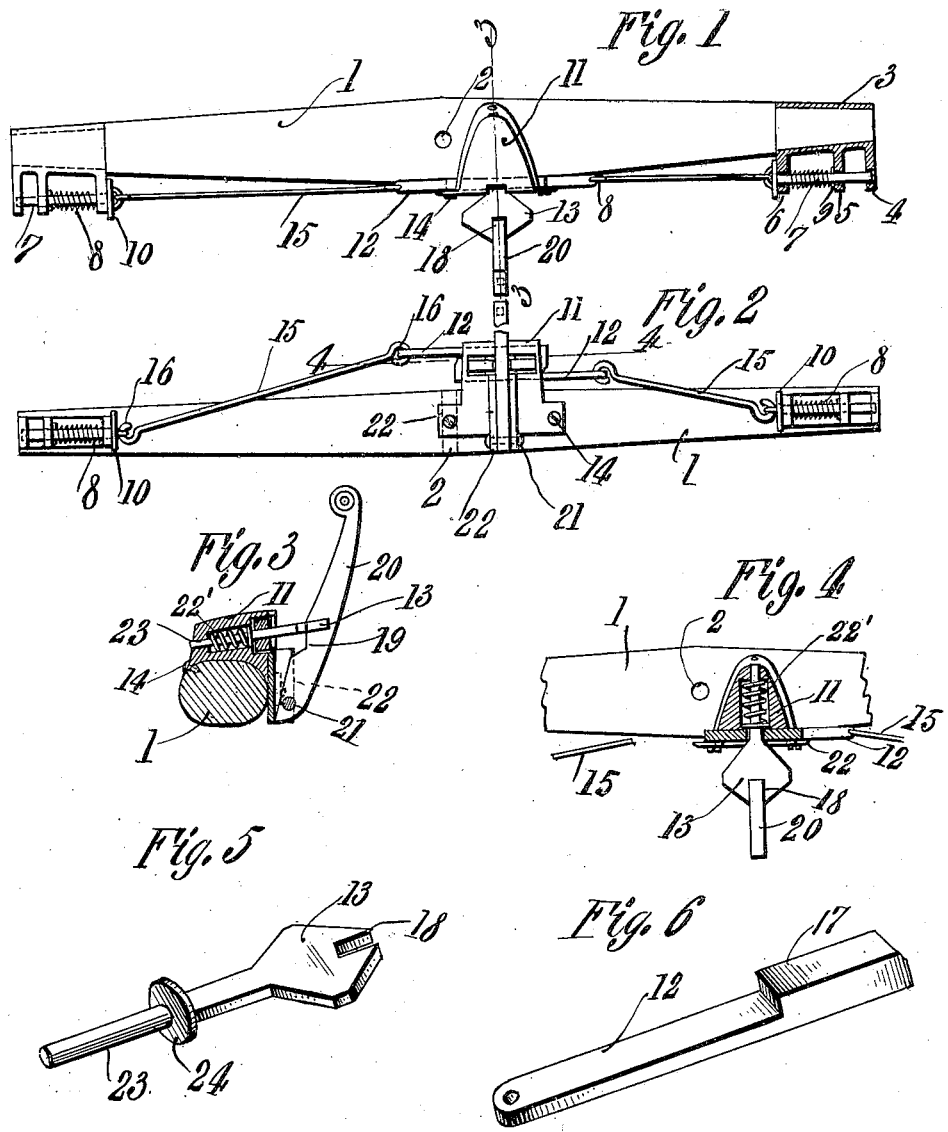
Witnesses
L. O. Little
F. Jacobs
Inventor
M. F. Sadler
By Watson E. Coleman
Attorney

UNITED STATES PATENT OFFICE.

MILLARD FILLMORE SADLER, OF DURANT, OKLAHOMA.

HORSE-DETACHING DEVICE.

No. 922,518. Specification of Letters Patent. Patented May 25, 1909.

Application filed January 16, 1909. Serial No. 472,705.

*To all whom it may concern:*

Be it known that I, MILLARD F. SADLER, a citizen of the United States, residing at Durant, Oklahoma, have invented certain new and useful Improvements in Horse-Detaching Devices, of which the following is a specification, reference being had to the accompanying drawings.

This invention relates to improvements in horse detaching devices and more particularly to one specially adapted for use on a swingletree to permit the traces to be quickly disconnected therefrom.

The object of the invention is to provide a simple and practical device of this character with improved means for retracting the trace fastening bolts or pins.

With the above and other objects in view, the invention consists of the novel features of construction and the combination and arrangement of parts hereinafter fully described and claimed, and illustrated in the accompanying drawings, in which—

Figure 1 is a plan view of a swingletree having the improved horse detaching means applied thereto; Fig. 2 is a front elevation; Fig. 3 is a vertical transverse section taken on the plane indicated by the line 3—3 in Fig. 1; Fig. 4 is a detail horizontal section taken on the plane indicated by the line 4—4 in Fig. 2; Fig. 5 is a detail perspective of the double wedge plate; and Fig. 6 is a detail perspective of one of the slides actuated by the double wedge.

In the drawings 1 denotes a swingletree or equivalent device of any suitable form and construction having at its center a vertical opening 2 to receive a pivot. At the ends of the swingletree are provided means for connecting traces or the like thereto so that they may be quickly disconnected, the said means preferably consisting of metal sleeves 3 formed upon their front faces with three spaced lugs 4, 5, 6 having registering openings to receive a sliding pin or bolt 7. Coil springs 8 surround the bolt 7 and are confined between the inner lugs 6 and transverse stop pins 9 arranged in the bolts, as shown. Said springs project the outer ends of the bolts across the spaces between the lugs 4, 5, which ends of the bolts enter eyes or the like upon the traces or equivalent connecting means, as will be readily understood. Stop flanges or collars 10 upon the inner ends of the bolts limit the movement of the same under the action of their springs 8.

For the purpose of retracting the bolts 7 simultaneously to permit both traces to be quickly disconnected from the swingletree, I provide, adjacent to the center of the latter, means for moving the bolts inwardly in their bearing lugs, the said means consisting of a bearing 11, two slides 12 arranged therein and operatively connected to the bolts 7 and a double wedge 13 to enter the bearing and simultaneously actuate the slides in opposite directions. The bearing 11 is angular in shape to fit upon the top and front side face of the swingletree and it is formed with apertured attaching flanges to receive screws, bolts or similar fastenings 14. The upper portion of the bearing 11 is recessed to provide intersecting longitudinal and transverse guide openings. The slides 12 are arranged in the longitudinal guide opening. These slides are in the form of bars which project from opposite sides of the bearing 11 and have their outer ends connected by links 15 to eyes 16 upon the flanged inner ends of the bolts 7. The inner ends of the slide bars 12 are superposed so as to overlap and upon their opposing faces are formed oppositely disposed lugs 17 between which the double wedge 13 enters. Said wedge is arranged in the transverse guide opening of the bearing and is in the form of a metal plate having a V-shaped rear end to enter between the lugs 17 and a notched or recessed front end 18 to receive a recessed portion 19 of an operating lever 20. The latter is pivoted at its lower end by a pin 21 in spaced guide and bearing ears 22 upon the lower front portion of the bearing 11 and the free upper end of said lever is apertured to receive a cord, link or other operating device. The lever is preferably arranged in an upwardly and forwardly inclined position and it is prevented from dropping below such position by arranging the pivot 21 slightly above its lower extremity so that the latter will engage the lower portion of the bearing 11 to limit the swinging movement of the lever, as will be seen upon reference to Fig. 3 of the drawings. For the purpose of retracting the wedge 13, a coil spring 22′ is arranged in the recessed portion of the bearing 11 and surrounds a stem 23 projecting from the V-shaped end of the wedge plate 13. Said coil spring has one of its ends engaged with a shoulder 24 on the stem 23, as clearly shown in Fig. 4 of the drawings.

In operation, it will be seen that when it is desired to connect the traces to the swingletree, the same may be readily done by retracting the bolts 7 separately by hand and placing the eyes upon the traces between the lugs 4, 5. When it is desired to quickly disconnect the traces, it is only necessary to actuate the upper end of the lever 20 rearwardly, whereupon its wedge 13 will be thrown in the same direction into the bearing 11 and between the lugs 17 on the slide bars 12 so that said slide bars will simultaneously retract the bolts 7.

While the embodiment of the invention shown and described is arranged upon a swingletree and adapted for connecting the traces thereto, it will be understood that the invention may be applied to a doubletree, an axle, or the like for connecting draft devices so that they may be quickly and easily disconnected. When the invention is applied to an axle for connecting the shafts or thills thereto, it will be seen that in the case of the animal running away, it may be quickly detached from the buggy or other vehicle.

Having thus described the invention what is claimed is:

1. The combination of a swingletree, means at its ends for detachably connecting draft devices thereto, a bearing arranged on the swingletree intermediate its ends and having intersecting longitudinal and transverse guide openings, longitudinally extending slides operatively connected to said means, said slides having their inner ends arranged in overlapping relation in the longitudinal guide openings of the bearing and being formed with ribs to provide opposing shoulders, a V-shaped wedge plate slidably arranged in said transverse guide opening and between the overlapping inner ends of the slides, the inclined edges of said wedge plate being engaged with the ribs on said slides, a spring for actuating said wedge plate in one direction and a lever for actuating said wedge plate in the other direction.

2. The combination of a swingletree, means at its ends for detachably connecting draft devices thereto, a bearing arranged on the swingletree intermediate its ends and having intersecting longitudinal and transverse guide openings, said bearing being formed opposite the transverse guide opening with a socket, a pair of superposed longitudinally extending slides operatively connected to said means, the inner ends of said slides being arranged in overlapping relation in the longitudinal guide openings of the bearings and being formed with transverse ribs to provide oppositely disposed shoulders, a V-shaped wedge plate arranged in the transverse guide opening of the bearing and between the overlapping inner ends of the slides, the inclined edges of said plate being engaged with said ribs upon the slides and the inner end of said plate being formed with a shouldered stem to enter said socket in the bearing, the outer end of said wedge plate being formed with a notch, a coil spring surrounding said shouldered stem and arranged in said socket, and an upright lever pivoted at its lower end and having a notched intermediate portion to enter the notch in said wedge plate.

3. The combination of a swingletree, means at its ends for detachably connecting draft devices thereto, a bearing arranged on the swingletree intermediate its ends and having intersecting longitudinal and transverse guide openings, said bearing being formed with a socket arranged opposite the transverse guide opening and said bearing being also formed with a depending bracket portion having spaced bearing ears, longitudinally extending slides operatively connected to said means, said slides having their inner ends overlapping and arranged in the longitudinal guide openings in the bearing and formed with transverse ribs to provide oppositely disposed shoulders, a V-shaped wedge plate arranged in the transverse guide opening of the bearing and between said overlapping inner ends of the slides, the inclined edges of said wedge plate being engaged with said ribs upon the slides and the inner end of said wedge plate being formed with a shouldered stem to project into said socket, a coil spring arranged upon said shouldered stem in the socket, a lever pivoted adjacent to its lower end between the spaced ears upon said depending bracket on the bearing and adapted to have its upper portion engage and actuate said wedge plate and its lower extremity engage said depending bracket to limit the swinging movement of the lever in one direction.

In testimony whereof I hereunto affix my signature in the presence of two witnesses.

MILLARD FILMORE SADLER.

Witnesses:
IRA MOON,
W. A. COOPER.